United States Patent [19]

Schroeter et al.

[11] 4,076,489

[45] Feb. 28, 1978

[54] METHOD FOR COATING PHOTOFLASH LAMPS

[75] Inventors: Siegfried H. Schroeter, Schenectady; Donald A. Bolon, Scotia; Gary M. Lucas, Schenectady, all of N.Y.

[73] Assignee: General Electric Company, Schenectady, N.Y.

[21] Appl. No.: 792,924

[22] Filed: May 2, 1977

Related U.S. Application Data

[63] Continuation of Ser. No. 699,474, Jun. 24, 1976, abandoned, which is a continuation-in-part of Ser. No. 592,194, Jul. 1, 1975, abandoned.

[51] Int. Cl.² .......................... B05D 1/18; B05D 3/06; F21K 5/02
[52] U.S. Cl. ........................................ 431/94; 427/54; 427/106
[58] Field of Search ................... 427/54, 106; 431/94

[56] References Cited

U.S. PATENT DOCUMENTS

| | | | |
|---|---|---|---|
| 2,787,559 | 4/1957 | Coney et al. | 427/106 |
| 2,868,670 | 1/1959 | Van Laar et al. | 427/106 |
| 3,022,653 | 2/1962 | Baird | 431/94 X |
| 3,156,107 | 11/1964 | Shaffer | 431/94 |
| 3,218,832 | 11/1965 | Seidler | 431/94 |

*Primary Examiner*—James R. Hoffman
*Attorney, Agent, or Firm*—William A. Teoli; Joseph T. Cohen; Jerome C. Squillaro

[57] ABSTRACT

A method for coating photoflash lamps with UV curable solventless organic resins having desirable transmission characteristics in the cured state to render the lamps shatter resistant upon flashing wherein the photoflash lamp is dipped into resin for a period of 3–60 seconds followed by UV irradiation of the treated lamp to cure the resin.

12 Claims, No Drawings

METHOD FOR COATING PHOTOFLASH LAMPS

This application is a continuation application of co-pending application Ser. No. 699,474, filed June 24, 1976, now abandoned, which is a continuation-in-part application of our copending application Ser. No. 592,194, filed July 1, 1975 now abandoned and assigned to the same assignee as the present invention.

The present invention relates to a method for treating photoflash lamps to improve their shatter resistance upon flashing. More particularly, the present invention relates to treating photoflash lamps with a UV curable solventless organic resin having desirable transmission characteristics in the cured state and the cure of such solventless organic resins with ultraviolet radiation.

Those skilled in the art know that uncoated, high intensity photoflash lamps can crack and even shatter when flashed. When such shattering occurs, it is usually accompanied by noise. One method which can be used to prevent shattering and cracking is to coat the lamp with an organic resin. However, the organic resin used must not only provide containment, but it also should allow the transmission of the balanced spectrum to satisfy USA standard for still photography. In achieving a balanced spectrum to satisfy USA standards, substantially the same spectral response for all three component emulsions must be achieved in the color film.

Prior to the present invention, a solution of cellulose acetate in the form of a lacquer in an organic solvent, such as acetone, was widely employed by the photoflash lamp industry. Excellent containment and transmission results are achieved with cellulose acetate as a photoflash lamp lacquer. However, the use of a lacquer is necessarily associated with solvent evaporation. Secondly, in order to build up coating thickness necessary for reliable containment, several dips of the flash bulbs into the lacquer are required. Between dips, the solvent must be evaporated. This process is lengthy and expensive.

In order to improve the process of coating lamps with a containment lacquer, with respect to the elimination of multiple dipping and loss of solvent, attention was directed to solventless organic resins. A variety of solventless organic resins are available, such as acrylic, epoxy, polyester, polythiol-polyene, etc., which must be cured to produce the necessary toughness needed for containment. Although the use of such solventless organic resins would overcome the problem of solvent evaporation and air polution, it was not known, prior to the present invention, whether the cure of such resins as containment coatings for photoflash lamps could be effected in an economic manner. In addition, the transmission characteristics of such cured resins also were not known. Those skilled in the photoflash lamp art know, for example, that in order for a resin to have desirable transmission characteristics, its Spectral Distribution Index "SDI" at 5500° K daylight is substantially weighted to achieve nearly the same spectral response for all three component emulsions in the color film. Color film response is negligible below 360 nm (nanometers) or 3600A, and above 680 nm or 6800A. The critical ranges appear to fall between 360 nm to 480 nm, 480 nm to 560 nm and 560 nm to 680 nm in the Blue, Green and Red regions respectively. A desirable SDI reading of 0-0-0, 1-0-0, 0-1-1, etc., would indicate a satisfactory balance, while a reading of 0-3-6 would indicate an imbalance favoring red. It has been found, however, that flash bulb containment coatings generally favor transmission in the regions above 400 nm. Lamps treated with cellulose acetate lacquer have been found to transmit approximately 85% of the light generated within the long wave ultraviolet light range of 350 nm to 400 nm. It was found that the UV curable solventless organic resins evaluated as possible candidates for containment coatings, as a replacement for cellulose acetate, transmitted less than about 50% of light at 360 nm and less than 60% at 380 nm. As a result, a color imbalance resulted, rendering these solventless organic resins unsuitable as possible containment coating materials for photoflash lamps.

The present invention is based on the discovery that certain UV curable solventless organic resins have been found which are suitable as containment coatings on flash bulbs, which can transmit at least 70% of the radiant energy in the 375 nm region and at least 80% in the 400 nm region when measured as a 10 mil thick cured film on a glass slide in a recording spectrophotometer.

There is provided by the present invention a method for coating a flash bulb with an organic resin to substantially improve its shatter resistance upon flashing while not substantially altering the spectral balance of the light transmitted within the range of about 360 nm to above 680 nm, and between the blue region of about 360 nm to 480 nm, the green region of 480 nm to 560 nm and the red region of 560 nm to above 680 nm which comprises, (1) dipping the flash bulb in a UV curable solventless organic resin having a viscosity in the range of about 100 to 10,000 centipoises at dipping temperatures, (2) pulling the flash bulb from the UV curable solventless organic resin within a period of between 3 to 60 seconds, and (3) thereafter effecting the cure of the UV curable solventless organic resin by irradiating the treated flash bulb with UV irradiation, where the UV curable solventless organic resin can transmit at least 70% of the radiant energy in the region of about 378 nm and at least 80% in the region of about 400 nm when measured as a 10 mil thick cured film on a glass slide in a recording spectrophotometer.

Included by the UV curable solventless organic resin which can be used in the practice of the present invention are epoxy resins, acrylic resins and mixtures of polyolefincally unsaturated organic compounds hereinafter referred to as "polyenes" blended with polyfunctional organic thiols, referred to hereinafter as "polythiols" and the blends referred hereinafter to as "thiolene" resins. More particularly, epoxy resins which can be used contain 0.05 to 3% by weight of a halonium salt photosensitizer as shown as follows:

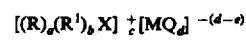

where R is a monovalent aromatic organic radical, $R^1$ is a divalent aromatic organic radical, X is a halogen radical such as I, Br, Cl, etc., M is a metal or metalloid and Q is a halogen radical such as Cl, F, Br, I, etc., a is a whole number equal to 0 or 1, the sum of $a + b$ is equal to 2 or the valence of X $c = d - e$ $e$ = valence of M and is an integer equal to 2 to 7 inclusive, and $d$ is $> e$ and is an integer having a value up to 8.

Radicals included by R can be the same or different, aromatic carbocyclic or heterocyclic radicals having from 6 to 20 carbon atoms, which can be substituted with from 1 to 4 monovalent radicals selected from $C_{(1-8)}$ alkoxy, $C_{(1-8)}$ alkyl, nitro, chloro, etc., R is more particularly phenyl, chlorophenyl, nitrophenyl, methoxyphenyl, pyridyl, etc. Radicals included by $R^1$ are divalent radicals such as

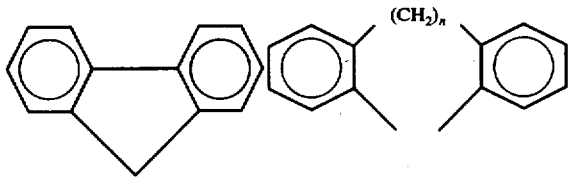

etc. Metal or metalloids included by M of formula 1 are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., antinides, such as Th, Pa, U Np, etc., and metalloids such as B, P, As, etc. Complex anions included by $MQ_d^{-(d-e)}$ are, for example, $BF_4^-$, $PF_6^-$, $AsF_6^-$, $SbF_6^-$, $FeCl_4^-$, $SnCl_6^-$, $SbCl_6^-$, $BiCl_5^-$, etc.

Some of the epoxy resins which can be used with the above halonium salt photosensitizers are polyethyleneoxide diglycidyl ethers, polypropyleneoxide diglycidyl ethers, polypropyleneoxide diglycidyl ethers, epoxidized oils such as soybean or flaxseed oils, cycloaliphatic epoxides such as vinylcyclohexene dioxide or bis(3,4-epoxy-6-methylcyclohexylmethyl) adipate and 3,4-epoxycyclohexylmethyl-3,4-epoxycyclohexane carboxylate, etc.

Included in the acrylic resins which can be used are, for example, acrylated epoxidized oils such as soybean or flaxseed oils where the acrylate may be acrylic or methacrylic, acrylate derivatives of bis-isocyanates, acrylate or methacrylate derivatives of polyesters, polyurethanes, epoxy resins, etc., dissolved in mixtures of mono- and multi-functional acrylate or methacrylate monomers such as ethylhexyl acrylate, trimethylolpropane triacrylate, etc. Photoinitiators which can be used with the acrylic resins include some of the photoinitiators described for the thiolene resins below in combination with tertiary amines such as N,N,N',N'-tetramethyl-1,3-butane diamine, N-methyldiethanol-amine, etc.

In addition to the above epoxy and acrylic resins, the UV curable solventless organic resins which can be used in the practice of the invention are thiol-ene resins, some of which are shown by Kerr et al., U.S. Pat. Nos. 3,697,395, 3,697,396, 3,697,402, 3,700,574 and 3,661,744. It has been found that effective transmission results with the thiol-ene resins can be obtained if .001 to .5 part by weight of a photoinitiator such as benzophenone is used. Typical of the thiol-ene resins which can be used in the practice of the invention are stoichiometric (equal SH and olefin) mixtures of a polythiol such as

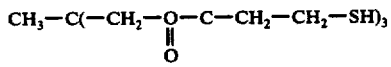

and various primarily aliphatic or cycloaliphatic olefins such as diallyl phthalate, triallyl mesitylate, triallyl isocyanurate, the reaction product of toluene-diioscyanate with allyl alcohol,

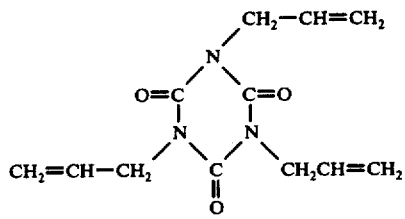

Triallyl cyanurate, the allylalcohol adduct of 1,6 hexamethylene bisisocyanate, etc. Fillers may be added to a formulation as needed to arrive at desirable physical of chemical properties. For example, plasticizers of flexibilizers may be added. In addition, stabilizers such as free radical traps may be present to optimize the nature of the resin.

Photoinitiators which can be used in combination with the above-described components of the thiol-ene resins of the present invention are, for example, benzophenone, acetophenone, dibutylketone, etc. The benzophenone photoinitiator can be used in a proportion of from about 0.001% to 0.5% by weight, and preferably 0.01% to 0.2%.

In preparing the thiol-ene resin compositions of the present invention, the polyfunctional organic olefin, hereinafter referred to as the "polyolefin" is blended with the polyfunctional aliphatic thiol, hereinafter referred to as the "polythiol" along with an effective amount of the photoinitiator. Prior to curing, the curable thiol-ene compositions may be pumped, poured, siphoned, brushed, sprayed, doctored or otherwise handled as desired. Substantially stoichiometric equivalents of olefinically unsaturated radicals and thiol radicals will provide for effective results in the final cured product. It has been found, however, that desirable results can be achieved if an excess of from 0.01 to 0.5 equivalents of olefinically unsaturated radicals of the polyolefin is present per thiol radical of the polythiol in the final mixture.

Along with the above-described photoinitiator, the thiol-ene resins of the present invention also can contain from 0.001 to 0.1 percent by weight of inhibitor to improve the shelf life of the composition prior to cure. Suitable inhibitors are, for example, 2,6-di-tert-butyl-para-cresol, 2,6-di-tert-butyl, 1-hydroxy-4-propiophenone. In addition other ingredients such as inert fillers can be present at from 0.01 to 20 parts of filler per 100 parts of the thiol-ene resin. Suitable fillers include, for example, fumed silica, etc.

In the practice of the invention, one or more flash bulbs can be dipped in a batchwise or continuous manner in the UV curable resin which hereinafter will signify the above-described epoxy, acrylic and thiol-ene resin at a temperature in the range of from 10° to 60° C to provide a dipping viscosity of about 100 to 10,000 centipoises. It has been found that after the flash bulb has been immersed sufficiently in the UV curable resin to completely cover the unexposed glass surface, it can be removed at a rate of from 3 to 60 seconds depending upon the thickness of the coating desired on the surface of the lamp. Thicker coatings, for example, can be achieved by removing the lamp over 6 seconds, as compared to 60 seconds. One or more lamps can be treated in this fashion, depending upon the requirements of the operator. After the flash bulb has been dipped in the UV curable resin it can be exposed to ultraviolet irradiation over a period of 5 seconds or less to 5 minutes or more depending upon the distance and the intensity of the irradiation. A coating thickness of from about 8–12 mil will provide for a proper containment.

A suitable source of ultraviolet irradiation can be found from artificial sources such as Type RS sunlamps, carbon arc lamps, Xenon arc lamps, mercury vapor lamps, tungsten arc light lamps, etc. Effective rusults can be achieved when the ultraviolet light intensity on the surface of the UV curable resin falls within the range of about 2000 to 100,000 microwatts per sq. cm.

A convenient test for determining whether the UV curable resin or other photocurable organic resin has desirable transmission characteristics as defined above prior to cure is as follows:

A sample of the UV curable resin is knife coated to a thickness of about 10 mils onto a 2 in × 3 in glass slide and cured under UV light. The slide is placed in a recording spectrophotometer and measured for light transmission in the 350 nm to 450 nm region. Suitable spectrophotometer are, for example, a Beckman DK2A, Cary-14, etc. If at least 70% transmission is obtained in the region of about 375 nm and at least 80% transmission is obtained in the region of about 400 nm, as compared to transmission in air, or untreated glass slide the UV curable resin has satisfactory transmission characteristics.

In order that those skilled in the art will be better able to practice the present invention, the following examples are given by way of illustration and not by way of limitation. All parts are by weight.

EXAMPLE 1

A thiol-ene resin in formulated from 65 parts of trimethylolpropane tris-$\beta$-thiopropionate, 35 parts of trialylcyanurate, 0.2 part of benzophenone and 0.1 parts of a stabilizer. The resulting UV curable resin has a viscosity of about 600 centipoises at 25° C.

One hundred flash cube type uncoated flash lamps are dipped in the above UV curable resin and removed within 3–6 seconds. The treated lamps are then exposed for 2–3 minutes per lamp under a GE H400A mercury arc lamp at a distance of about 2 inches. The coated lamps are then flashed to determine their containment characteristics. It is found that 100 coated lamps do not crack while 80% of an equal number of uncoated lamps of the same type crack upon flashing.

A 2 × 3 inch glass slide is coated with 10 mils of the above UV curable resin, and the resin is cured under UV irradiation as described above. The transmission of light in a Cary-14 Spectrophotometer shows that the resin transmits about 80% in the region of about 375 nm and about 89% in the region of about 400 nm. This transmission is confirmed by measuring the output of treated flash lamps in accordance with the procedure shown by the United States of America Standards Institute USAS p. 112.28–1967 bulletin for USA Standard Method for Evaluating Effective Spectral Energy Distribution of Blue Photoflash Lamps. The SDI number is found to be 012, which is acceptable.

The above procedure for making the UV curable resin is repeated except the level of benzophenone is increased to about 2% by weight based on the weight of resin. Flash lamps coated with the cured resin as described above show satisfactory containment characteristics but undesirable transmission characteristics. The SDI values are found to be 056 which are unacceptable. The undersirable transmission characteristics of the cured resin is confirmed by the above-described test using a coated glass slide in a Cary-14 Spectrophotometer. A transmission of less than 50% of obtained at 375 nm and less than 50% at 400 nm.

The above results show that the percent by weight of photoinitiator can be critical for particular resins with respect to transmission characteristics of the cured resin.

EXAMPLE 2

A mixture of 100 parts of 3,4-epoxycyclohexylmethyl-3,4-epoxycyclohexane carboxylate and 100 parts of polypropyleneoxide bis-glycidylether is sensitized with 2 parts of ditolyl iodonium hexafluoroarsonate. A UV curable resin is obtained having a viscosity of about 1500 centipoises at 25° C.

One hundred flash lamps are coated with a cured 10 mil film of the above UV curable resin in accordance with the method of Example 1. The coated bulbs are flashed and satisfactorily pass the containment test. A transmission of greater than 70% is obtained at 375 nm and greater than 80% at 400 nm region using a Cary-14 Spectrophotometer. The coated lamps also show 110 SDI numbers when flashed confirming the fact that the coating is transmitting satisfactorily.

The above procedure for making the UV curable resin is repeated except triphenyl sulfonium hexafluoroarsonate is used in place of the above-described iodonium hexafluoroarsonate. There is obtained a UV curable resin which can be used satisfactorily to contain the flash lamps upon flashing. However, the transmission characteristics of the cured film result in a 027 SDI number which is unacceptable. This is confirmed by a transmission of less than 60% at 375 nm and less than 70% at 400 nm of a cured film in a Cary-14 Spectrophotometer as described above.

The above results establish that the nature of the photoinitiator can be critical with respect to transmission in epoxy resins.

EXAMPLE 3

There is blended 65 parts of the acrylic acid adduct of bis-phenol A-diglycidyl ether and 35 parts of ethylhexylacrylate. The resulting mixture is sensitized with 2 parts of benzaldehyde and 3 parts of N-methyldiethanol amine. The resulting UV curable resin has a viscosity of about 2000 centipoises at 25° C.

One hundred flash lamps are coated with the above UV curable acrylic resin and treated lamps are irradiated as described in Example 1. No cracking occurs in the coated lamps. The coated slides have adequate transmission.

EXAMPLES 4–6

A thiol-ene resin is formulated as shown in Example 1, except it is sensitized with 1 part of ditolyliodonium hexafluoroarsonate in place of benzophenone.

Flash lamps coated with the above thiol-ene resin cured in accordance with the procedure of Example 1, exhibit satisfactory containment.

Light transmission of a 10 mil cured film in a Cary-14 Spectrophotometer of the above thiol-ene resin shows a transmission greater than 70% at about 375 nm and greater than 80% at about 400 nm.

The above procedure is repeated except 1 part of di-tolyl iodonium hexafluorophosphate is used in place of di-tolyl iodonium hexafluoroarsonate. Substantially the same transmission and containment results are obtained.

An additional thiol-ene resin is prepared as described in Example 1, except that 1 part of benzaldehyde is used in place of benzophenone. Substantially the same results are obtained with respect to transmission and containment. Additionally, from about 0.1 part to about 5 parts of benzaldehyde are also found to provide effective results.

As shown in copending application Ser. No. 699,475, of Daniel R. Olson et al. filed concurrently herewith and assigned to the same assignee as the present invention, the UV curing method of the present invention can be applied to flash lamps dipped into polyacrylated urethane composition comprising (A) from about 10 mole percent to 90 mole percent of a polyacrylate of the formula,

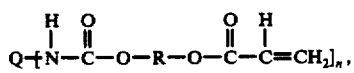

(B) from about 10 mole percent to about 90 mole percent of a monoacrylate of the formula

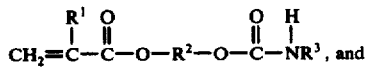

(C) from 0.1% to 5% by weight, based on the weight of the UV curable composition of a photoinitiator, where Q is a polyvalent organic radical selected from $C_{(1-20)}$ aliphatic and $C_{(6-30)}$ aromatic, R is $C_{(1-8)}$ alkylene radical and $n$ is an integer having a value of from 2 to 4 inclusive, $R^1$ is selected from hydrogen or $C_{(1-8)}$ alkyl, $R^2$ is selected from $C_{(1-8)}$ alkylene and $R^3$ is selected from $C_{(1-20)}$ aliphatic and $C_{(6-30)}$ aromatic.

EXAMPLE 7

A UV curable resin was prepared consisting of 50 parts of the diacrylate of the formula,

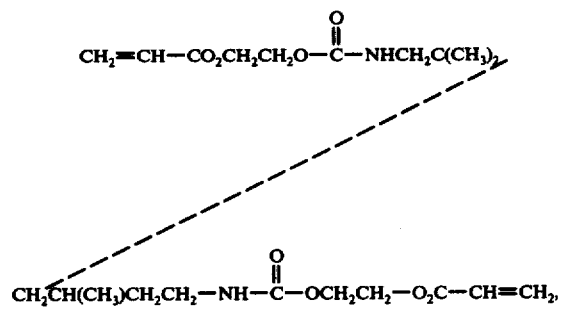

50 parts of 2-acryloyloxypropyl N-phenylcarbamate, 10 parts of dibutylsebacate and about 1 part of diethylacetophenone. The viscosity of the resulting resin was about 1000 centipoises. A cube type flash bulb was dipped into the resin and then withdrawn in a period of 8 to 10 seconds resulting in a surface deposite of about 10 mils of the resin on the surface of the flash bulb. The flash bulb was then held upright and allowed to stand for 5 to 10 seconds to allow for redistribution of the UV curable resin on the surface of the flash bulb. The flash bulb was then exposed under a GE H26T811 lamp at a distance of 5 to 7 inches for a period of from 1 to 5 minutes. The bulb was then flashed and the resin satisfactorily contained the bulb since no cracking occurred.

A quartz substrate was then treated with the above UV curable resin to a thickness of to about 10 mils and cured as above. Following the procedure of Example 1, the glass slide is placed in a recording spectrophotometer and measured for light transmission in the 350 nm to 450 nm region. There is used a Cary 14 spectrophotometer. It is found that at least 70% transmission is obtained in the region of about 375 nm and at least 80% transmission is obtained in the region of about 400 nm. This shows that the light transmission characteristics of the resin are suitable for flash bulbs.

As shown in Example 1 of copending application Ser. No. 699,475 of Daniel R. Olson et al, a test slab of the above polyacrylated urethane blend was capable of surviving the tropical "90/90" test. The test slab was exposed for a period of 15 hours at 90° F and 90% relative humidity and thereafter measured within 15 minutes of removal time from the aforementioned tropical conditions to determine any change in physical characteristics. The following results were obtained with the test slab of the above polyacrylated urethane, where "T" is tensile (psi) and "E" is percent elongation:

| Before | | After | |
|---|---|---|---|
| T | E | T | E |
| 6,000 | 8 | 2,000 | 22 |

Based on results found with various UV curable organic resins when tested as slabs in accordance with ASTM D1708, satisfactory lamp containment can be predicted if the UV curable organic resin can be cured to a film having an elongation at break of at least 8%, a Youngs Modulus of at least 14,000 (psi) and a tensile (psi) of at least 1200.

Although the above examples are limited to only a few of the very many UV curable resins and photoiniators which can be used in the practice of the method of the present invention, it should be understood that the present invention is directed to the use of a UV curable resin which can allow transmission of at least 70% of radiant energy in the region of about 375 nm and at least 80% in the region of about 400 nm when a cured 10 mil film is measured in a recording spectrophotometer, as well as provide excellent containment when the flash bulb is flashed, which indicates a noise level of not greater than about 115 decibels.

What we claim as new and desire to secure by Letters Patent of the United States is:

1. A method for coating a flashbulb with an organic resin to substantially improve its shatter resistance upon flashing while not substantially altering the spectral balance of the light transmitted within the range of 360 nm to about 680 nm and between the blue region of 360 nm to 480 nm, the green region of 480 nm to 560 nm and the red region of 560 nm to above 680 nm which comprises, (A) dipping the flashbulb in a UV curable solventless organic resin having a viscosity in the range of 100 to 10,000 centipoises at dipping temperatures, (B) pulling the flashbulb from the UV curable solventless organic resin within a period of between 3 to 60 seconds, and (C) thereafter effecting the cure of the UV curable solventless organic resin by irradiating the treated flashbulb with UV irradiation, where the UV curable solventless organic resin can transmit at least 70% of the radiant energy in the region of 375 nm and at least 80% of the radiant energy in the region of 400 nm when measured as a 10 mil thick cured film on a glass slide in a recording spectrophotometer.

2. A method in accordance with claim 1, where the UV curable resin is a mixture of a polyolefin and polythiol and 0.001% to 0.5% by weight of benzophenone.

3. A method in accordance with claim 1, where the UV curable resin is a mixture of an acrylic monomer and an acrylic polymer.

4. A method in accordance with claim 1, where the UV curable resin is an epoxy resin containing a halonium salt as a photoinitiator.

5. A method in accordance with claim 4, where the halonium salt is ditolyliodonium hexafluoroarsonate.

6. A method in accordance with claim 3, where the UV curable resin is sensitized with a mixture of benzophenone or benzaldehyde and N-methyl-diethanol amine.

7. A method in accordance with claim 1, where the flash bulb is dipped in the UV curable organic resin within a period of from about 3 to 6 seconds.

8. A method in accordance with claim 1, where the UV curable resin is a mixture of a polyolefin, a polythiol and 0.01 to 2% by weight of a halonium salt.

9. A method in accordance with claim 8, where the photoinitiator is ditolyl iodonium hexafluoroarsonate.

10. A method in accordance with claim 1, where the UV curable resin is a mixture of a polyolefin, a polythiol and from about 0.1 to 5% by weight of benzaldehyde as a photoinitiator.

11. A method in accordance with claim 1, where the UV curable organic resin is curable to a film having an elongation at break of at least 8%, a Youngs Modulus of at least 14,000 psi and a tensile of at least 1200 psi.

12. A coated photoflash lamp made in accordance with the method of claim 1.

* * * * *